US 9,118,764 B2

(12) United States Patent
Mistry

(10) Patent No.: US 9,118,764 B2
(45) Date of Patent: Aug. 25, 2015

(54) METHOD AND SYSTEM TO DETERMINE AND EMPLOY BEST CONTACT OPPORTUNITY

(71) Applicant: Avaya Inc., Basking Ridge, NJ (US)

(72) Inventor: Pritesh Mistry, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/963,650

(22) Filed: Aug. 9, 2013

(65) Prior Publication Data

US 2015/0043727 A1    Feb. 12, 2015

(51) Int. Cl.
*H04M 3/00* (2006.01)
*H04M 5/00* (2006.01)
*H04M 3/523* (2006.01)
*H04M 3/51* (2006.01)

(52) U.S. Cl.
CPC ............ *H04M 3/523* (2013.01); *H04M 3/5175* (2013.01)

(58) Field of Classification Search
CPC ..... H04M 3/5158; H04M 3/51; H04M 3/523; H04M 3/5183
USPC ............ 379/266.07, 266.01, 266.06, 266.08, 379/265.05, 265.11, 265.1
See application file for complete search history.

(56) References Cited

U.S. PATENT DOCUMENTS

| 4,599,493 A | 7/1986 | Cave |
| 4,829,563 A | 5/1989 | Crockett et al. |
| 4,881,261 A | 11/1989 | Oliphant et al. |
| 4,933,964 A | 6/1990 | Girgis |
| 5,179,589 A | 1/1993 | Syu |
| 5,436,965 A | 7/1995 | Grossman et al. |
| 5,621,790 A | 4/1997 | Grossman et al. |
| 7,620,722 B1 * | 11/2009 | Ruparel ..................... 709/227 |
| 8,094,804 B2 * | 1/2012 | Flockhart et al. ........ 379/266.03 |
| 8,751,274 B2 * | 6/2014 | Flockhart et al. ............ 705/7.12 |
| 2011/0206199 A1 * | 8/2011 | Arora ....................... 379/266.01 |
| 2014/0369488 A1 * | 12/2014 | Zgardovski et al. ..... 379/266.07 |

OTHER PUBLICATIONS

"CallTech™," ALI Solutions, Jan. 2012, 2 pages, retrieved from [www.alisolutions.com/products/overview/calltech].
"OnQ™," ALI Solutions, Jan. 2012, 2 pages, retrieved from [www.alisolutions.com/products/overview/onq].

* cited by examiner

*Primary Examiner* — Thjuan K Addy
(74) *Attorney, Agent, or Firm* — Sheridan Ross P.C.

(57) ABSTRACT

Contact centers, such as outbound call centers, are provided with means by which they may attempt to contact individuals at a time and via a channel preferred by the contact. A history of prior contact interactions is used as one means to establish a preferred contact time and channel. With a preferred contact time and/or channel established, the contact center may attempt to reach the contact with a decreased likelihood of the attempt being consider a nuisance.

20 Claims, 5 Drawing Sheets

| Preponderance | Completion code | Description | Weight |
|---|---|---|---|
| Bad | 00 | No Answer | 0 |
| | 01 | Answer, no RPC | 1 |
| | 02 | RPC + hostile disconnect | 2 |
| | 03 | RPC + queries, no success | 3 |
| Neutral | 04 | RPC + callback request | 4 |
| | 05 | RPC + queries + 'will get back' | 5 |
| | 06 | RPC + queries + follow up required | 6 |
| Good | 07 | Probable success | 7 |
| | 08 | Success, pending confirmation | 8 |
| | 09 | Success, confirmed | 9 |

RPC=Right Party Connect

| Customer | Channel | Address Type | Address | M1 RPC % | M2 Responsiveness % | M3 Positive Completion % | M4 Best Times | M5 Worst Times |
|---|---|---|---|---|---|---|---|---|
| John Doe | Voice | Home | +91 20 4004 1234 | 10% | 0% |  |  |  |
|  |  | Cellular 1 | +91 98906 12345 | 100% | 20% | 20% | 16:00 - 17:00 | 07:00 - 16:00 |
|  |  | Work | +91 20 4101 1234 | 50% | 10% | 30% | 11:00 - 13:00 | 16:00 - 18:00 |
|  |  | Cellular 2 | +91 98903 12345 | 100% | 0% | 0% |  |  |
|  | SMS | Cellular 1 | +91 99906 12345 | 100% | 100% | 80% | 11:00 - 17:00 | 17:00 - 22:00 |
|  |  | Cellular 2 | +91 98903 12345 | 100% | 10% | 10% | 20:00 - 21:00 | 08:00 - 20:00 |
|  | Email | Email 1 | john.doe@gmail.com | 100% | 10% | 0% |  |  |
|  |  | Email 2 | jdoe@avaya.com | 100% | 0% | 0% |  |  |
|  |  | Email 3 | john@outlook.com | 100% | 100% | 100% | 21:00 - 23:00 | 07:00 - 21:00 |

*Fig. 6*

METHOD AND SYSTEM TO DETERMINE AND EMPLOY BEST CONTACT OPPORTUNITY

FIELD OF THE DISCLOSURE

The present disclosure is generally directed toward outbound contact centers and, more particularly, determining and implementing a best time and/or mode of contact.

BACKGROUND

Outbound contact centers commonly follow a sequential order when making outbound contacts. Certain campaign or regulatory limitations may curtail times of contacts, such as no calls between 9:00 PM to 10:00 AM. During the hours that calls, or other contacts modes (e.g., e-mail and SMS), can be placed, contact centers strive to maximize human agent utilization.

As human agents are the most expensive contact center resource, the object of maximizing human agent utilization is to provide the most cost effective contact center operations. Dialers may then be employed to place calls. If the call does not connect or there is some other failure to reach the intended party, the call is disconnected and the next call is placed. If the call is connected, the human agent is brought on to the call. If no agent is available, the person called may have to wait for a free agent to join the call. If the callee has to wait more than a couple seconds, the callee may consider the call a nuisance call and disconnect.

SUMMARY

It is with respect to the above issues and other problems that the embodiments presented herein were contemplated.

The embodiments herein generally relate to outbound contact centers running campaigns for direct customer interaction. More specifically, method and system are provided to determine the best mode and time of contact, and employ an anachronistic pacing algorithm to schedule such customer interactions. The mode of contact could be through telephony which could be agent based or automated voice, or through text/multimedia messaging, email, chat, social networking, or any other method listed in the customer record. The preferred time of contact is honored in such a manner that the contact interactions is initiated independent of the chronological order of the customer record in the contact list being processed by the dialer.

Thus, it abstracts a supervisor from the time and mode of contact, allowing it to be provided with only the customer list. The dialer will thereafter determine the most optimal method of contact and the best time for it from the data that it generates at every campaign, and use this for attempting an interaction with the customer.

In an outbound contact center, the predictive dialer is typically optimized to handle contact lists only in a manner that optimizes agent utilization over the probability of a positive customer interaction. It is not possible to reasonably analyze and infer on both the mode of contact that is most optimal for a given customer, be it email, short message service ("SMS"), automated voice calls, or agent based voice call, and the time that a customer prefers for those modes. Only a combination of this both is most likely to result in a favorable customer contact.

In the prior art, there is no way of provisioning this in the current outbound solutions. The dialers are agnostic of individual customers in a contact list. The contact lists are created externally, and provided to the dialer, which in turn simply processes individual contact addresses (phone/SMS number, email ID, SIP address, etc) in these lists at a rate that is determined by the length of each interaction, and the chronological placement in the list. That is, the dialers do not have any information as to where and when to attempt an interaction with the customer in the contact list, or if provided, use such information. The mode of contact is pre-determined by the contact strategy that is similarly applicable to every contact in the list, and not on preferences of that customer, and when to contact is determined by the length of the contact list and the position of a given contact address in it. For example, some customers may prefer a non-intrusive, asynchronous, yet interactive SMS over talking directly to an agent, in the mornings. Yet others may prefer getting informed through emails, rather than on their phones, in the evenings. Such campaigns, that are unaware about a customer's preferences, are more is likely to be ineffective and inefficient.

The rate at which outbound calls should be placed is determined by the call pacing algorithms in a dialer. These algorithms are based on the number of agents available, and the calls pending. Without the benefit of the teachings herein, it cannot take into consideration any calls that may need to be placed at a predefined point of time. Thus, if additional calls are introduced outside of those that it has counted, there are chances that an agent may not be available for that call, and it could result in a 'nuisance' call. In other words, prior art pacing algorithms do not accommodate for the customers' preferred time of contact without increasing the incidence of nuisance calls. This is important because communication regulations of various countries dictate proportion or nuisance calls allowed per campaign.

One embodiment provided herein provides the dialer a way to infer on how and when to contact the customer, and a way to schedule the contact at that time by optimally pacing the calls so as not to affect the incidence of nuisance calls. It also provides a way to override the finding with regional preferences.

In another embodiment, means to automatically select both, the best mode (e.g., channel and/or address) of contacting the customer and the best time for that contact method based on historical interactions with that customer is provided. Further, it affects the pacing algorithm such that the customer interaction occurs at the given time even at the cost of agent utilization. Thus, it allows agents to remain un-utilized and their service levels fall, or if required, utilized elsewhere, in lieu of initiating the interaction at the given time.

Another embodiment modifies the pacing algorithm to now keep track of, and take into consideration interactions outside of the given sequential contact list, so that when the current time falls within an average call length from a pre-scheduled call, it accommodates for this call by not servicing calls from the sequential contact list. This should negate the chances of a nuisance call from agent unavailability if the mode of contact is agent based voice call.

Preferably, at every interaction, metadata is associated with the customer address. This metadata may be initialized at startup to follow certain pattern before the system starts collecting metadata around the addresses of a customer. Each interaction with the customer gets a disposition 'completion code' associated with it. These completion codes may be 'weighed' and associated with some score. For example, listed in FIG. 1, is how 10 different completion codes are mapped against their weight, such as, from 0-9. The value of the weight may depend, at least in part, on Right Party Connect ("RPC") whereby the intended recipient of the call was reached, and then on the relative success of a customer interaction.

Implementation of certain embodiments herein may require an ability to handle 'big data'. For example, a customer record includes a number of interactions, each interaction attempt is stored with a disposition code. The disposition code is mapped to weights, such as described above. Initially, the interaction attempts are made following contact strategy devised by the supervisor. Over a period of time, with a reasonable interaction history, we would build up on disposition codes for every contact address over hours of day, days of week, and months of a year.

Now, when a contact list is created for a campaign, the list may then carry additional metadata describing top 'n' contact addresses for each customer record, and their top 'm' times of interaction.

When the list is processed, such as by the campaign manager module of an outbound solution, it analyses the best time and address for interaction, and delays or holds the interaction until that time arrives for the record. If the time has already passed, it will look for the next best address; however, the weight for this address at the given time should be greater than a configurable threshold for an attempt to be made, else the contact interaction is put on hold until the same time arrives in the next cycle.

If a contact interaction is put on hold by the campaign manager module, it may notify the pacer module running the pacing algorithm of the future time of interaction attempt for this record. When allowing interaction attempts for a given list, the pacer in turn will discount as many records from the list as those that are put on hold for the given time. This way, despite interactions being already scheduled, the number of interaction attempts made remain proportional to the resources needed for the same. If these scheduled calls are not discounted from the calculations, the pacer may attempt more interactions than those that may be supported by the outbound system. As a result, the pacer may prevent calls when resources are unavailable for servicing an interaction, which in case of agents, could lead to nuisance calls.

As a specific example of one embodiment, consider the following situation:
  a calling list with 600 customer records
  an outbound solution with 20 automated voice ports with speech recognition and synthesis
  3 human agents available for agent based calls
  Average call length for automated voice calls is 5 minutes
  Average call length for agent based calls is 2 minutes, with 1 minute of wrap up time.

Given this, about (60/5)*20=240 automated voice calls, or (60/3)*3=60 agent based calls could be placed every hour. A dialer, without the benefit of the teachings herein, will typically pace 20 automated calls, and 3 agent based calls at any given point of time, assuming 100% availability of all resources. With the benefit of the teachings herein, if two customers prefer agent based interaction at exactly 10:00 AM, the pacing algorithm needs to be aware of this, and not service at least 2 other customers after 9:57 AM, otherwise no agents will be available for the two pre-scheduled calls, leading to dead air and a high probability of the call being a nuisance call.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures:

FIG. 6 is a customer record in accordance with embodiments of the present disclosure.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
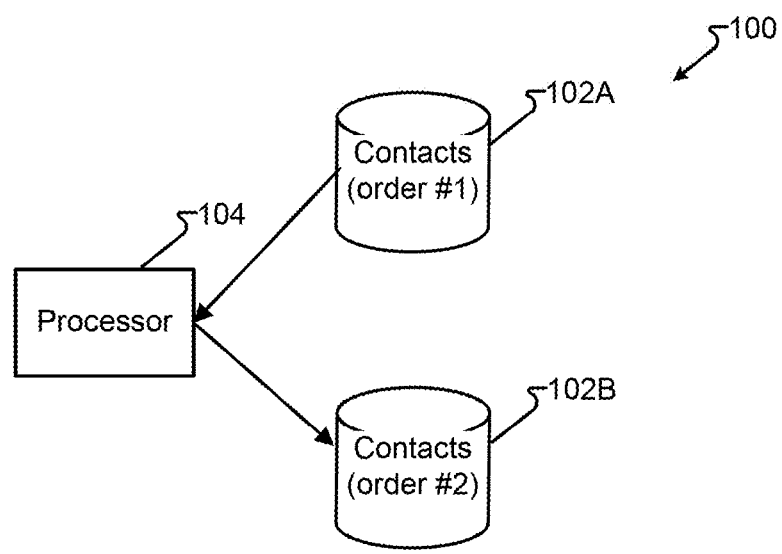
FIG. 1 is a block diagram of a system operable in accordance with embodiments of the present disclosure.

FIG. 1 is a block diagram of system 100 operable in accordance with embodiments of the present disclosure. System 100 may be embodied within a personal computer, a large distributed computing center, or other computing platform. In one particular embodiment, system 100 is embodied within a contact center operable to make outbound calls and other outbound contacts to customers, prospective customers, survey subjects, or other individuals; collectively known as "contacts." System 100 may then be integrated into a contact center such that contacts may be processed by resources, including human and/or automated agents.

In one embodiment, list of contacts 102A, in a first order, is processed by processor 104 to become list of contacts 102B, in a second order. In one embodiment, processor 104 orders contacts in accord with a single resource operable to contact ones of the contacts in list of contacts 102B. In another embodiment, a plurality of resources is operable to contact ones of the contacts in list of contacts 102B. In yet another contact, one or more resources are operable to contact ones of the list of contacts 102B via one or more channels.

A channel is a communication medium including, but not limited to, one or a combination of, plain old telephone system ("POTS"), session initiation protocol ("SIP"), voice over IP, SMS, email, and text and/or video chat. While a channel may be technology-specific when initiated, for example, a contact center may consider all voice telephony calls to be placed on a channel, even if such calls are to/from POTS telephones and/or SIP endpoints. The recipient may consider the device to be an endpoint of a channel, regardless of how the call originated. For example, a call received on a home telephone may be considered a different channel than a call received on a business telephone, despite the calls originating from the same or similar telephony equipment.

In one embodiment, list of contacts 102A, and subsequently list of contacts 102B, may be a large number of contacts. In another embodiment, list of contacts 102A may be as few as a single entry. Such an embodiment may be implemented during real-time processing of list of contacts 102B, whereby individual contacts are received and placed in list of contacts 102B by processor 104. When the one or more contacts in list of contacts 102B require a delay before processing, an idle period may be inserted—such as more fully discussed with respect to FIG. 2. In other embodiments, the idle period is an event that signals a resource that the contact should now be contacted. The idle period may afford the resource the opportunity to process other tasks or it may be a period of no work activity.

List of contacts 102B may be distinct from list of contacts 102A. In an alternative embodiment, list of contacts 102B may replace list of contacts 102A. In yet another alternative embodiment, list of contacts 102B may be list of contacts 102A with a table, index, pointers, linked list, or other attribute indicating the reordering.

Figure 2:
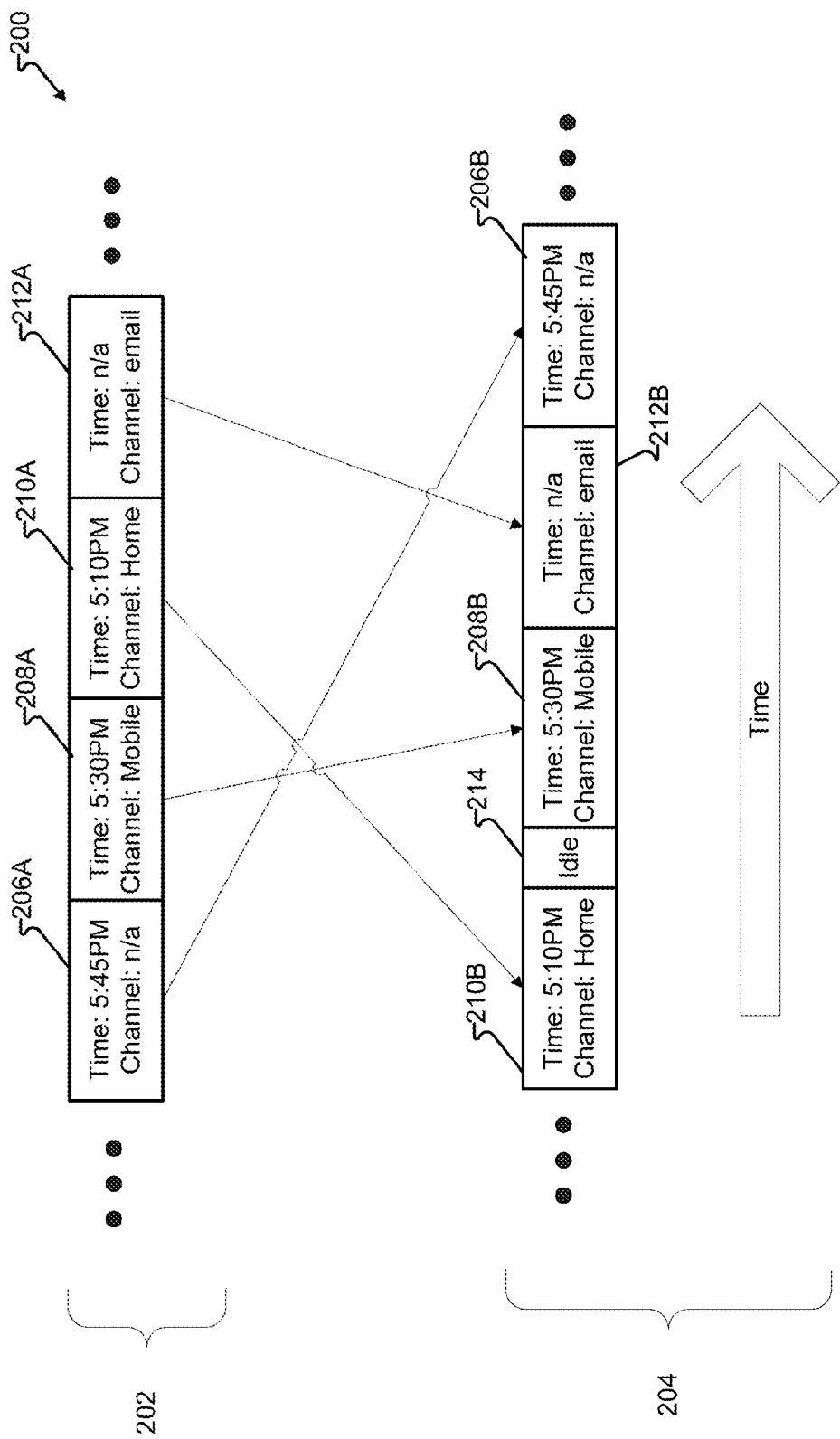
FIG. 2 is a data structure diagram of a reordered list of contacts in accordance with embodiments of the present disclosure.

FIG. 2 is a data structure diagram 200 illustrating the reordering of list of contacts 202 in accordance with embodiments of the present disclosure. List of contacts 202 is in a first order. The first order being random, alphabetical, or any order agnostic to the contact's preferred contact method and/or time. List of contacts 202 may, by happenstance, be in an order that is in the contact's preferred contact time, in such rare cases the embodiments disclosed herein may then confirm the desired order, schedule the appropriate resource in accord with the channel, and/or insert any needed idle periods.

In one embodiment, contact 206 has a preferred contact time of 5:45 PM and no preferred channel. Therefore contact 206A is moved to a position in list of contacts 204 such that the resource processing list of contacts 204 is estimated to be able to accept contact 206B at the preferred contact time (e.g., 5:45 PM) via a channel of choice by the contact center, agent, and/or other means. Contact 208 has a preferred contact time of 5:30 PM on a mobile phone. Accordingly, contact 208A is positioned as contact 208B in list of contacts 204.

Contact 210 has a preferred contact time of 5:10 PM and a preferred contact channel of "home" (e.g, home telephone). Accordingly, contact 210A is placed into list of contacts 204 in an order such as to make it contact 210B.

In another embodiment, the pacing of telephone calls, such as "home" of contact 210 and "mobile" of contact 208 results in idle task 214 to be inserted in to list of contacts 204. As a result, the resource processing list of contacts 204 is not assigned another task which may take longer to processes and result in missing a next contact, such as contact 208B preferred time of 5:30 PM. Contacts that are not known to have a preferred time, such as task 212, may then be placed into list of contacts 204 to fill up available time. In another embodiment, tasks with a preferred channel, also such as task 212, may be placed into a different list of contacts for processing by other resources.

In a further embodiment, contacts 206, 208, 210 and 212 may have a preferred time, preferred range of times, time to avoid, and/or range of times to avoid. In yet another embodiment, a single contact, such as contact 208A may be placed into list of contacts 204 which is operating as a real-time queue for immediate processing by a resource. In such an embodiment, the processing of the queue operates to order ones of the contacts 206, 208, 210, 212 and optionally insert any idle tasks 214 to avoid the making of nuisance calls.

Figure 3:
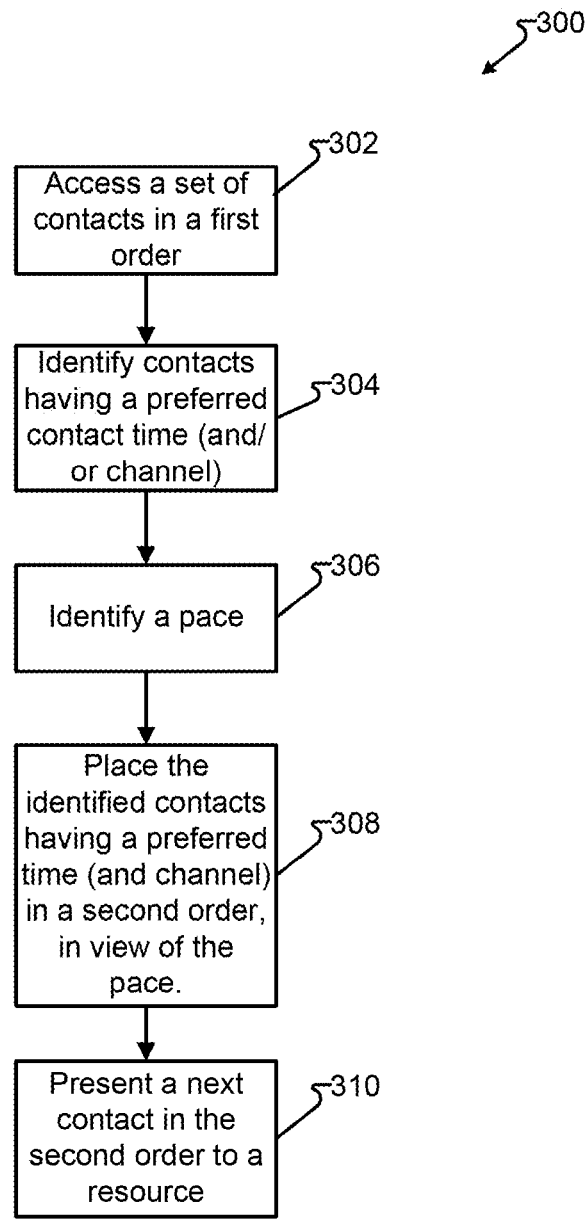
FIG. 3 is a flowchart in accordance with embodiments of the present disclosure.

FIG. 3 is flowchart 300 in accordance with embodiments of the present disclosure. Flowchart 300 discloses one embodiment of steps to place contacts in a proper sequence with respect to their preferred contact time and/or channel. In one embodiment, step 302 accesses a set of contacts in a first order. The first order being without regard to the time and/or channel preference of the constituent contacts. Step 304 identifies contacts with a preferred contact time (and/or optionally preferred contact channel). Step 306 identifies a pace. The pace may be specific to a particular resource, channel, type of contact (e.g., sales, survey, etc.) or other aspect as a matter of design choice. Step 308 then places ones of the contacts into an order (and optionally any idle tasks whereby a resource is left idle so as to better ensure the resource is available when the time comes to process a contact). Step 310 presents a next contact to a resource for processing. Optionally, step 310 may store the reordered list of contacts for later processing by a resource.

Figures 4, 5:
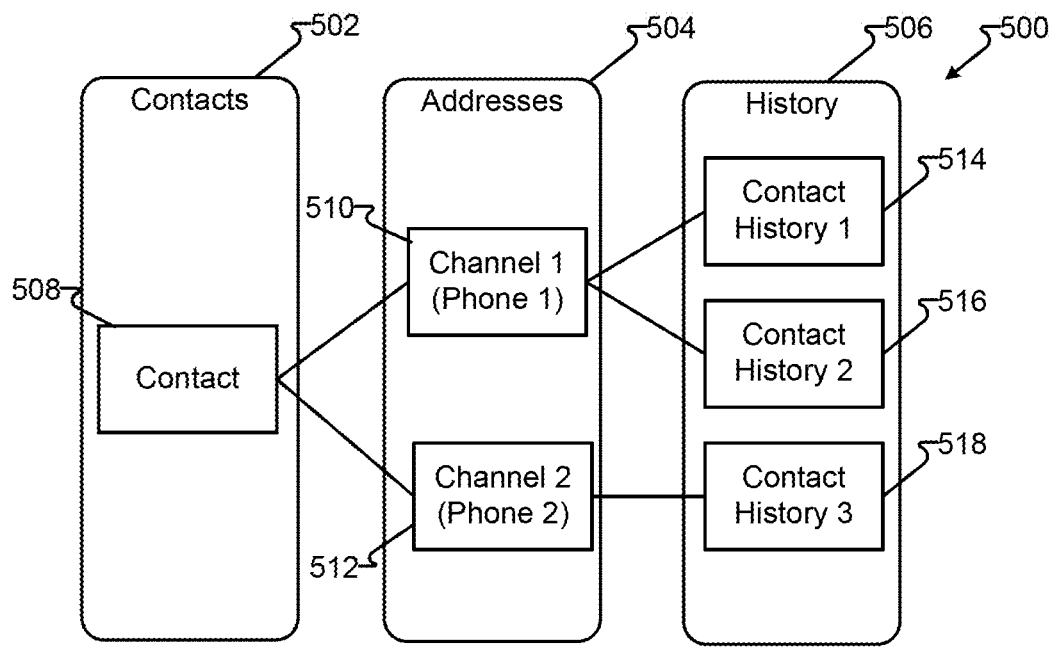
FIG. 4 is a completion code table in accordance with embodiments of the present disclosure.
FIG. 5 is a data flow diagram in accordance with embodiments of the present disclosure.

FIG. 4 is a completion code table 400 in accordance with embodiments of the present disclosure. In one embodiment, a contact has preferred contact time and/or channel established by direct statement (e.g., the contact explicitly states their preferred time and/or channel). In another embodiment, each attempt to reach the contact results in a completion code. The completion code may then be mapped to a weight. For example, a contact resulting in a "will get back" from the RPC may be weighted as a "5" upon making contact at 6:30 PM on their home phone. Whereas another attempt to contact (e.g., different time and/or channel) resulted in hostile disconnect and is weighted as a "2." Therefore, in determining a preferred code, if a resource is available to call the contact's home number at 6:30 PM, it is more likely to be successful than the other time and/or channel.

In a further embodiment, the contact center attempting to reach the contact may see the contact prefers a certain time, but due to other considerations (e.g., workload, urgency, etc.) may still utilize a contact time/channel with a lower weight for a future contact attempt.

FIG. 5 is data flow diagram 500 in accordance with embodiments of the present disclosure. Diagram 500 illustrates a data structure whereby contacts 502 are associated with addresses 504 and a history 506. In one embodiment, contact 508 has two addresses, channel 1 (510) and channel 2 (512). Prior interactions with contact 508 on channel 1 (510) resulted in history 1 (514) and history 2 (516). Prior interaction with contact 508 on channel 2 (512) resulted in history 3 (518).

History 1 (514), history 2 (516), and history 3 (518) may each include a completion code and/or weight (see FIG. 4) to better determine a preferred contact time and/or channel, as is discussed more fully with respect to FIG. 6.

FIG. 6 is one customer record 600 in accordance with embodiments of the present disclosure. In one embodiment, customer record 600 includes entries for customer 602, channel 604, address type 208, address 610, RPC % 612, responsiveness 614, positive completion 616, best times 618, and worst times 620. As a benefit of record 600, a preferred time and/or channel may be determined and/or a worst time and/or channel may be determined.

In the embodiment illustrated, John Doe is always available on both his cellular phones (RPC % is 100%), the interactions on either of these phone numbers has seldom had positive results. He is more responsive to SMS texts sent to his first cellular number. This is especially so during day time, from 11:00 to 17:00. Besides this, he is even more approachable and responsive at the end of the day, on his third email id. Thus, the best way to contact John Doe is through email, between 2100-2300, or through SMS on his first cellular number earlier in the day.

In another embodiment, regional preferences may be employed whereby all contacts within a certain geographic and/or political boundary are provided with a set of worst times 620, best times 618, best channel 604, and/or best address.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
   accessing a set of contacts to be contacted by a contact center resource, the set of contacts being in a first order;
   identifying a first subset of contacts from the set of contacts, each contact in the first subset of contacts having a preferred contact time;
   identifying a pace, corresponding to a rate at which the resource is expected to complete a task, the task including proactively contacting one of the set of contacts; and
   reordering the set of contacts such that at least one contact from the first subset of contacts is placed in a different position in the set of contacts based on the identified preferred contact time and identified pace.

2. The method of claim 1, further comprising:
  identifying a second subset of contacts from the set of contacts having a preferred address;
  identifying the pace, the pace further corresponding to a rate at which the resource is expected to complete the task, the task further comprising contacting one of the set of contacts at the preferred address of the one of the set of contacts; and
  the reordering of the set of contacts, further comprises, reordering the set of contacts such that at least one contact from the first subset of contacts is placed in a different position in the set of contacts based on the preferred address.

3. The method of claim 2, wherein the reordering of the set of contacts, further comprises, upon determining that the resource is unavailable to perform the task of contacting the at least one of the contacts in accord with the at least one of the preferred contact time and the preferred address of the at least one contact, reordering the set of contacts such that the at least one contact from the first subset of contacts is placed in a different position in the set of contacts based on at least one of a secondary preferred contact time and a secondary preferred channel.

4. The method of claim 2, further comprising, determining at least one of the preferred time and the preferred address for ones of the set of contacts by determining the time, address, and the degree of success in which a number of prior contacts were completed for the ones of the set of contacts.

5. The method of claim 1, determining the preferred time for ones of the set of contacts by determining the time and the degree of success in which a number of prior contacts were completed for the ones of the set of contacts.

6. The method of claim 1, wherein the reordering of the set of contacts, further comprises, placing ones of the contacts that are not members of the first subset of contacts, into a position in the set of contacts based on availability of the position.

7. The method of claim 1, whereby the resource includes a plurality of resources.

8. The method of claim 1, further comprising, upon determining that a prior task cannot be assigned to the resource without the resource, in accord with the pace, being unavailable to initiate the task, inserting an idle period as the prior task, the idle period ending at the identified preferred contact time.

9. The method of claim 1, wherein the preferred contact time is a range of time.

10. A system, comprising:
  a computer;
  a network interface operable to facilitate communication between the computer and other networked components; and
  the computer being further operable to:
  access a set of contacts to be contacted by a contact center resource, the set of contacts being in a first order;
  identify a first subset of contacts from the set of contacts, each contact in the first subset of contacts having a preferred contact time;
  identify a pace, corresponding to a rate at which the resource is expected to complete a task, the task including initiating and making contact with one of the set of contacts;
  reorder the set of contacts such that at least one contact from the first subset of contacts is placed in a different position in the set of contacts based on the identified preferred contact time and identified pace; and
  store the reordered set of contacts in a data storage.

11. The system of claim 10, further comprising, the computer stores the reordered set of contacts as a second set of contacts.

12. The system of claim 10, wherein the computer is further operable to:
  identify a second subset of contacts from the set of contacts having a preferred address;
  identify the pace, the pace further corresponding to a rate at which the resource is expected to complete the task, the task further comprising contacting one of the set of contacts at the preferred address of the one of the set of contacts; and
  the reorder of the set of contacts, further comprises, reorder the set of contacts such that at least one contact from the first subset of contacts is placed in a different position in the set of contacts based on the preferred address.

13. The system of claim 10, further comprising, a channel interface operable to connect the computer with at least one of the set of contacts.

14. The system of claim 10, further comprising, a task assignment engine, further operable to assign a next contact in the second order to a resource for contacting by the resource.

15. The system of claim 10, further comprising, the computer being operable to determine that a prior task cannot be assigned to the resource without the resource, in accord with the pace, being unavailable to initiate the task, insert an idle period as the prior task, the idle period ending at the identified preferred contact time.

16. A non-transitory computer readable medium with instructions that, when executed, cause a machine to perform:
  accessing a set of contacts to be contacted by a contact center resource, the set of contacts being in a first order;
  identifying a first subset of contacts from the set of contacts, each contact in the first subset of contacts having a preferred contact time;
  identifying a pace, corresponding to a rate at which the resource is expected to complete a task, the task including initiating contact with one of the set of contacts; and
  reordering the set of contacts such that at least one contact from the first subset of contacts is placed in a different position in the set of contacts based on the identified preferred contact time and identified pace.

17. The instructions of claim 16, further comprising:
  identifying a second subset of contacts from the set of contacts having a preferred address;
  identifying the pace, the pace further corresponding to a rate at which the resource is expected to complete the task, the task further comprising contacting one of the set of contacts at the preferred address of the one of the set of contacts; and
  the reordering of the set of contacts, further comprises, reordering the set of contacts such that at least one contact from the first subset of contacts is placed in a different position in the set of contacts based on the preferred address.

18. The instructions of claim 17, further comprising, creating of the second order, further comprises, upon determining that the resource is unavailable to perform the task of contacting the at least one of the contacts in accord with the at least one of the preferred contact time and the preferred address of the at least one contact, reordering the set of contacts such that the at least one contact from the first subset of contacts is placed in a different position in the set of contacts based on at least one of a secondary preferred contact time and a secondary preferred channel.

19. The instructions of claim 17, further comprising, determining at least one of the preferred time and the preferred address for ones of the set of contacts by determining the time, address, and the degree of success in which a number of prior contacts were completed for the ones of the set of contacts.

20. The instructions of claim 16, further comprising, determining the preferred time for ones of the set of contacts by determining the time and the degree of success in which a number of prior contacts were completed for the ones of the set of contacts.

* * * * *